(12) United States Patent
Beyer et al.

(10) Patent No.: US 10,040,920 B2
(45) Date of Patent: Aug. 7, 2018

(54) PROCESS OF INCORPORATING SOLID INORGANIC ADDITIVES INTO SOLID POLYMERS USING A LIQUID DISPERSION

(71) Applicant: Dow Global Technologies LLC, Midland, MI (US)

(72) Inventors: Douglas E. Beyer, Midland, MI (US); Michael L. Mounts, Midland, MI (US); Steven P. Sandor, Midland, MI (US)

(*) Notice: Subject to any disclaimer, the term of this patent is extended or adjusted under 35 U.S.C. 154(b) by 492 days.

(21) Appl. No.: 14/364,315

(22) PCT Filed: Dec. 12, 2012

(86) PCT No.: PCT/US2012/069061
§ 371 (c)(1),
(2) Date: Jun. 11, 2014

(87) PCT Pub. No.: WO2013/090313
PCT Pub. Date: Jun. 20, 2013

(65) Prior Publication Data
US 2014/0302300 A1    Oct. 9, 2014

Related U.S. Application Data

(60) Provisional application No. 61/569,347, filed on Dec. 12, 2011.

(51) Int. Cl.
*C08K 3/22*    (2006.01)
*C08K 5/1515*    (2006.01)
*C08J 5/18*    (2006.01)

(52) U.S. Cl.
CPC .................. *C08K 3/22* (2013.01); *C08J 5/18* (2013.01); *C08K 5/1515* (2013.01); *C08J 2327/08* (2013.01); *C08K 2003/2224* (2013.01)

(58) Field of Classification Search
CPC ............. C08K 3/22; C08K 5/1515; C08J 5/18
USPC ........................................................ 523/333
See application file for complete search history.

(56) References Cited

U.S. PATENT DOCUMENTS

| 3,261,793 | A | 7/1966 | Stevenson et al. |
| 4,418,168 | A | 11/1983 | Johnson |
| 5,002,989 | A | 3/1991 | Naumovitz et al. |
| 5,424,347 | A | 6/1995 | Blemberg et al. |
| 6,239,196 | B1 * | 5/2001 | Bussi ........... C08J 3/203 523/313 |
| 2003/0099813 | A1 | 5/2003 | Bekele |
| 2009/0123678 | A1 | 5/2009 | Beyer et al. |

FOREIGN PATENT DOCUMENTS

| EP | 2738217 A1 | 6/2014 |
| JP | H0952963 A | 2/1997 |
| JP | 2011178984 A | 9/2011 |
| WO | 89003858 A1 | 5/1989 |
| WO | 2000075222 A1 | 12/2000 |
| WO | 2011163162 A2 | 12/2011 |

OTHER PUBLICATIONS

Wessling, R.A. Polyvinylidene Chloride, Gordona and Breach, pp. 174-176, 1977.
M. A. Howell, F. M. Uhl, D. Townsend, The Impact of High Surface Area Magnesium Hydroxide on the Stability of Vinylidene Chloride Copolymers, Proceedings of the Conference of the North American Thermal Analysis Society, 26th Cleveland, Sep. 13-15, 1998, 388-393.
S. Heitzman, Coloring Processes, Encyclopedia of Polymer Science and Technology, online edition, Jul. 15, 2002.
Butler, T., Vargas, E., Veazey E. , Film Extrusion Manual: Process, Materials, Properties prepared by the Film Extrusion Committee of the Polymers, Laminatins and Coatings Division, TAPPLI Press, 1992, Chapter 3.
PCT/US2012/069061, International Search Report and Written Opinion of the International Searching Authority, dated Feb. 15, 2013.
PCT/ US2012/069061, International Preliminary Report on Patentability, dated Jun. 24, 2014.

* cited by examiner

*Primary Examiner* — Edward J Cain
(74) *Attorney, Agent, or Firm* — Brooks, Cameron & Huebsch, PLLC

(57) ABSTRACT

Disclosed is a process to produce an improved formulated vinylidene chloride polymer comprising a solid inorganic additive and producing improved vinylidene chloride polymer film products. The process includes adding the inorganic solid additive (such as magnesium hydroxide and/or other inorganic acid scavenger) in a dispersion of a liquid, such as a liquid plasticizer or stabilizer to improve distribution through the polymer and reduction of relatively large sized particles or agglomerates in the polymer and film.

13 Claims, No Drawings

PROCESS OF INCORPORATING SOLID INORGANIC ADDITIVES INTO SOLID POLYMERS USING A LIQUID DISPERSION

BACKGROUND OF THE INVENTION

This invention relates to improved solid polymers, particularly to vinylidene chloride (VDC) polymers, and films that are prepared from such polymers. Improving the incorporation of solid inorganic stabilization additives, such as magnesium hydroxide, into the polymer provides better polymer stabilization and improved film products when the improved distribution reduces the amount of relatively large inorganic additive particles or agglomerates that remain in the polymer and produce defects in the films.

Vinylidene chloride polymers, including polyvinylidene chloride ("PVDC"), require inorganic acid scavenger stabilizers, plasticizers and other additives for efficient and successful extrusion. This addition can take one or more of several forms and frequently involves, e.g., (i) additive addition in the form of multiple additives one-at-a-time or as a pre-blended premix or masterbatch by blending to obtain physical mixtures or melt mixtures into the resulting polymer powder or particles or (ii) feeding liquid additives such as plasticizers as part of the monomer feed to the process for making the polymer. Most solid additives, however, cannot be added to the process for making the polymer, and thus are typically added to the finished polymer after it has been recovered, de-watered and dried.

In U.S. Pat. No. 5,002,989 an inorganic stabilizer, high density polyethylene; epoxidized vegetable oil, oxidized polyolefin; and paraffin or polyethylene wax are added to a vinylidene chloride-methyl acrylate copolymer composition by individually adding and blending or by being separately blended together and combined concurrently with the vinylidene chloride copolymer.

Plastics pigmenting is known to use liquid colorants where solid colorant pigment is dispersed in an organic media like mineral oil and added to color plastics. See S. Heitzman, Coloring Processes, *Encyclopedia of Polymer Science and Technology*, online edition, Jul. 15, 2002.

As described in more detail in this application and the claims below, this invention is a process to produce an improved formulated vinylidene chloride polymer comprising a solid inorganic additive and producing improved vinylidene chloride polymer film products. The process includes adding the inorganic solid additive (such as an inorganic acid scavenger) in a dispersion of a liquid, such as a liquid plasticizer or stabilizer.

In one embodiment the invention is a process for adding an inorganic solid additive to solid polymer particles, the process comprising the steps of preparing a liquid dispersion comprising (1) the inorganic solid additive and (2) optionally one more other dispersible solid additives with (3) a liquid dispersing medium; combining the liquid dispersion with solid polymer; and mixing the components (1), (2) and (3). In alternative embodiments, the invention is such a process wherein the liquid dispersion comprises from 40 to 50 weight percent solid inorganic solid additive and alternatively wherein the liquid dispersion viscosity is from 50 to 500 centipoise (cP) when initially being combined with the polymer. In another embodiment of such a process, the inorganic solid additive is selected from: magnesium hydroxide, tetrasodium pyrophosphate, calcium hydroxide, calcium oxide, calcium carbonate, magnesium oxide, hydrotalcite, talc, clay, ignition resistance additives or combinations of two or more of these.

In a further embodiment of a process as generally described above, the liquid dispersing medium is selected from: epoxidized vegetable oil, epoxidized linseed oil, acetyl tributyl citrate, dibutyl sebecate, mineral oil, and combinations of two or more of these, with use of an epoxidized vegetable oil such as epoxidized soybean oil be a variation.

In one aspect of the process as generally described above, the solid polymer is vinylidene chloride polymer or polyvinyl chloride with a vinylidene chloride polymer being a preferred selection and including a vinylidene chloride copolymer also comprising from 3.5 to 10 weight percent methyl acrylate.

A preferred aspect of the process as described above includes the steps of preparing a liquid dispersion comprising (1) from 40 to 50 weight percent inorganic solid acid scavenger additive and (2) optionally one more other dispersible solid additives with (3) from 60 to 50 weight percent of a liquid epoxidized vegetable oil dispersing medium which weight percent are based on (1) and (2); combining the liquid dispersion with solid vinylidene chloride polymer particles; and mixing the components (1), (2) and (3). Other related embodiments of this invention include a polymer prepared according to any of the processes as disclosed herein, an extruded film comprising such a polymer and an extruded film comprising such a polymer wherein the polymer, as extruded into a film layer 0.2 mils (5.08µ) thick, comprises less than 10 particulates of inorganic solid additive having a dimension larger than 300 microns per 38 m² film.

Numerical ranges as used herein include all values from and including the lower and the upper values and including the increments and sub-groupings that can logically be derived from the type and breadth of the range that is defined. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are hereby deemed to be expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Moreover, the numerical ranges in this disclosure include values outside of the range as might fall with experimental error or rounding off of values unless otherwise indicated. Numerical ranges in this disclosure are provided for, among other things, the levels of additives employed and the temperature conditions for the mixing of those additives into vinylidene chloride polymer.

The term "comprising" is synonymous with "including," "containing," "having" or "characterized by," is inclusive or open-ended, and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

"Composition", "formulation" and like terms means a mixture or blend of two or more components. In the context of a mix or blend of materials from which barrier packing, e.g., film, is made, the composition includes the blend of the invention and any other additives, fillers and the like.

"Polymer" means the polymerization product of one or more monomers and is inclusive of homopolymers as well as interpolymers, copolymers, terpolymers, tetrapolymers, and the like and blends and modifications of any of the foregoing, including block, graft, addition or condensation forms of polymers.

"Mer", "mer unit" and like terms means that portion of a polymer derived from a single reactant molecule; for example, a mer unit from ethylene has the general formula —$CH_2CH_2$—.

"Interpolymer" or "copolymer" refers to a polymer that includes mer units derived from at least two reactants (normally monomers) and is inclusive of random, block, segmented, graft, and the like copolymers, as well as terpolymers, tetrapolymers, and trimers and oligomers.

"Molecular weight" is the weight average molecular weight (Mw) in Daltons. It is measured by size exclusion chromatography using polystyrene calibration. Sample preparation includes dissolving a polyvinylidene chloride resin sample in tetrahydrofuran (THF) at 50° C. Resin samples containing more than about 94 percent vinylidene chloride do not readily dissolve at this temperature, and dissolving at elevated temperature can result in degradation of the polymer molecular weight. Therefore, resin samples containing more than about 94 percent vinylidene chloride are pre-dissolved as a 1 percent (%) solution, in inhibited THF at 63° C. Samples can be dissolved at up to 83° C. for 4 hours without loss of molecular weight, though minimizing dissolving time and temperature is desirable. The polymers are then analyzed for determination of molecular weight by gel permeation chromatography (GPC) using the Polymer Laboratories Software on a Hewlett Packard 1100 chromatograph equipped with two columns in series. These columns contain 5 μm styrene/divinylbenzene copolymer beads commercially available from Polymer Laboratories under the trade designation PLGel 5μ MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (about 3,000,000 to 2000 Mp)) in conjunction with their elution volumes.

"Melting point" and like terms mean the property of a solid material corresponding to the transition from a solid to liquid material. Such properties can be readily measured by differential scanning calorimeter (DSC) as the glass transition temperature (Tg) for amorphous glassy materials and melting temperature for crystalline or semi-crystalline materials.

"Softening point" and like terms mean the temperature of a material at which it begins to significantly soften and become tacky. In the context of this invention, the softening point is the temperature at which a given material begins to adhere to the vinylidene chloride resin.

As known to practitioners in the area of plastic or polymer resin films, vinylidene chloride polymers are desirably employed in films to provide improved barrier properties. Unfortunately, depending upon several types of climate and film process conditions, small holes were being observed as defects in the vinylidene chloride polymer barrier films. Upon examination, the problem was arising due to visible white specks in the extruded film. The issue was further identified to be the presence of magnesium hydroxide agglomerates (white specks) having a size of the order of from 200 microns up to 600 microns in size, corresponding to or just slightly smaller than the size of the openings in the screen that is typically used to filter or screen the resin after the blending process.

As is also known those who formulate and/or fabricate vinylidene chloride copolymers, they are obtained as a fine dry powder or particulate and typically need to be formulated with solid inorganic additives, such as acid scavengers like magnesium hydroxide, that are commonly used as fine powders or particulates. Previously, magnesium hydroxide, for example, has been added as a dry powder in a resin blending process. It was found, however, that these inorganic additive powders can aggregate or agglomerate to larger particles that diminish their stabilization effectiveness, appear as white specks in an extruded film and cause holes or defects in the films. Since the vinylidene chloride polymer particles have a volume median particle size of about 280 microns, it is not practical to employ a screen with openings smaller than about 600 microns since it starts to screen or remove too much of the polymer.

According this invention, it has been found that vinylidene chloride polymer and other solid powder or particulate resins, can be extruded with reduced white specks and provide films or other articles with reduced visual defects such as holes when comprising solid inorganic additive, including inorganic acid scavengers such as magnesium hydroxide, that is pre-dispersed in a liquid and added as a liquid, preferably to coat or adhere to the polymer particles.

Solid vinylidene chloride polymer powders are well known and commercially available products. Typically they are produced through batch suspension polymerization which is well known in the art and which typically produces dense beads. Emulsion polymerization could also be used but since this typically produces a product in latex form, the vinylidene chloride polymer would first have to be converted to dry solid particles. This invention is also applicable to other solid particulate resins where dry blending is used for incorporation of solid additives, such as chlorinated polyethylene ("CPE") and particularly polyvinylchloride ("PVC"), and particularly where such resins are in the form of solid powders which, like vinylidene chloride polymers, have a volume median particle size in the range of from 100 micrometer (μ) to 400 micrometer and a fairly uniform size distribution of these particles.

The vinylidene chloride interpolymers of this invention typically comprise a majority of mer units derived from vinylidene chloride monomer and a minority of mer units derived from one or more mono-ethylenically unsaturated comonomers. The mer units derived from one or more these comonomers are typically present in an amount of not greater than 40, more typically not greater than 25 and even more typically not greater than 16, and still more typically not greater than 10 mole percent of the interpolymer. The mer units derived from one or more of these comonomers are typically present in an amount greater than zero, more typically greater than 1, even more typically greater than 2 and still more typically greater than 3, mole percent of the interpolymer. The balance of the mer units in the vinylidene chloride polymer are mer units derived from vinylidene chloride monomer.

Mono-ethylenically unsaturated comonomers suitable for use in the polymerization step of the present invention include vinyl chloride, alkyl acrylates, alkyl methacrylates, acrylic acid, methacrylic acid, itaconic acid, acrylonitrile, and methacrylonitrile. The mono-ethylenically unsaturated monomers are typically selected from the group consisting of vinyl chloride, alkyl acrylates and alkyl methacrylates, the alkyl acrylates and alkyl methacrylates having from 1 to 8 carbon atoms per alkyl group. The alkyl acrylates and alkyl methacrylates typically have from 1 to 4 carbon atoms per alkyl group. The alkyl acrylates and alkyl methacrylates are preferably selected from the group consisting of the methyl acrylate, ethyl acrylate, butyl acrylate and methyl methacrylate.

The weight average molecular weight (Mw) of the vinylidene chloride polymers used in the practice of this invention are typically of 50,000 to 250,000 Daltons, more typically of 70,000 to 130,000 Daltons, as measured by size exclusion chromatography using polystyrene calibration.

The standard types of vinylidene chloride polymer powders suitable for use in this invention are well known and commercially available products such as the SARAN brand polymer resin product(s) available from The Dow Chemical Company and the IXAN brand polymer resin product(s) available from Solvin. In addition, the other types of powder-form polymer resins requiring similar incorporation of solid inorganic additives in their formulation, e.g. PVC, are well known and commercially available products.

In general, this process is suited for use with a range of solid inorganic additives that will disperse in a liquid additive material. It is possible to employ inorganic additives available in powder forms, particularly hygroscopic inorganic powders. For application in this process, the additives (prior to dispersion and not including the agglomerates and like impurity particulates) should have an average particle size of less than 10 micrometer (µm), preferably less than 5µ and more preferably less than 2µ. In particular, the process is well suited to incorporate several of the typical vinylidene chloride polymer acid scavenger additives: magnesium hydroxide ($Mg(OH)_2$), tetrasodium pyrophosphate (TSPP), calcium hydroxide, calcium oxide and/or calcium carbonate. Examples of other solid inorganic additives that can be incorporated into polymers in this way include: magnesium oxide, hydrotalcite, talc, clay and solid inorganic ignition resistance additives.

In general, depending upon their required effective levels in the final polymer product, typical and preferred levels of such inorganic solid additives are:

| Inorganic Solid Additive | Incorporation levels (wt % based on weight polymer composition) | | |
| --- | --- | --- | --- |
| | Typical | Preferred | Most preferred |
| Magnesium hydroxide | 0.1-2% | 0.2-1.5% | 0.3-1.25% |
| Tetrasodium pyrophosphate | 0.1-2% | 0.2-1.5% | 0.3-1.25% |
| Calcium carbonate | 0.02-0.5% | 0.05-0.3% | 0.1-0.25% |

In general, depending upon the initial particle sizes of the inorganic solid additives and the particle sizes of the solid polymer in which the additives are being incorporated, in the resulting polymers, it is desirable to avoid inorganic solid additive agglomerates or particulates that are visible to the unaided human eye or cause defects in films or other articles which the polymers may be used to produce. For example, for vinylidene chloride polymer particles used to produce films, it is desired to avoid inorganic solid additive particulates or agglomerates in the size range of greater than about 300µ, preferably greater than about 200µ, more preferably greater than about 100µ. As used herein, the particle size of the particulates or agglomerates refers to its largest dimension, the particles themselves generally being irregularly shaped. The particulate or agglomerate particle size is measured by optical microscopy.

The liquid medium or agent that can be employed for dispersing the inorganic solid additive ("dispersing medium") can be any liquid plasticizer or other additives that can be used in polymers. For use according to the present invention, the dispersing medium must be "liquid" at the temperatures which are typically encountered in the formulation and compounding of polymer compositions, preferably within a temperature range of from 15° C. to 70° C. The liquid dispersing medium itself, therefore, needs to be sufficiently flowable and pumpable under these conditions to provide the liquid dispersion as described below. Suitable liquid dispersing medium materials include, for example epoxidized vegetable oils such as epoxidized soybean oil and epoxidized linseed oil, acetyl tributyl citrate, dibutyl sebecate, mineral oil, and the like, including combinations of two or more of these. Such liquid dispersing medium materials are typically incorporated into the polymer compositions, based on weight of liquid dispersing medium and total polymer composition, in the range of from 0.1 to 11 weight percent, preferably in the range of 0.2 to 9 weight percent, and more preferably in the range of from 0.5 to 7 weight percent.

The inorganic solid additive can be dispersed in the dispersing medium via a number of different process typically known and used for providing thorough mixtures of these two types of materials, such as, for example, ball milling, spindle or cowles mixer and the like. Preferably, and inorganic solid additive such as magnesium hydroxide is dispersed in a dispersing medium such as epoxidized soybean oil (ESO) by ball milling.

As this term is used herein, the "liquid dispersion" comprising the dispersing medium and inorganic solid additive (and any optional other dispersible solid additives) remains as a flowable and pumpable liquid at the temperature at which it is applied to and initially combined with the solid resin. For most dispersion and resin combinations according to this invention, this includes temperatures greater than or equal to about 10° C., and preferably temperatures less than or equal to about 80° C., more preferably both, and most preferably temperatures within the range of from 15° C. to 70° C. In general, a sufficiently "flowable and pumpable liquid" can readily be determined by practitioners of general skill in the art but it will generally be a liquid having a viscosity of less than about 1000 centipoise ("cP") preferably less than 500 cP, more preferably less than 400 cP, more preferably less than 300 cP, and most preferably less than about 200 cP when it is initially combined with the solid polymer. As a practical matter, the target viscosity for the dispersion is generally at least about 50 cP, preferably at least about 100 cP when it is initially combined with the solid polymer. Preferred viscosity ranges include from 50 to 500 cP, from 50 to 400 cP, from 100 to 400 cP and from 100 to 300 cP.

With some of the inorganic solid additives and liquid dispersing mediums, such as using liquid epoxidized vegetable oil plasticizers typically employed in vinylidene chloride polymers, this has been found to be dispersions that contain less than 60% percent solid, preferably less than 55% percent solid and more preferably less than 50% percent solid, based on total weight solid and liquid plasticizer. For many dispersions according to this invention, heating the dispersion to the higher end of the temperature range, at least 40° C., preferably at least 45° C., preferably at least 50° C., preferably at least about 55° C., may be used to decrease the viscosity if desired.

For example, with inorganic solid additives such as magnesium hydroxide, other solid additives for vinylidene chloride polymers optionally included in the dispersion and a dispersing medium such as epoxidized soybean oil, dispersions having suitable viscosities are provided that contain up to about 60 weight percent solid, preferably less than 55 weight percent solid and more preferably less than 50 weight percent solid, based on total weight solid additives and dispersing medium. As a practical matter and depending upon the level of the inorganic solid additive that needs to be employed in the resin, the inorganic solid additive dispersion typically contains at least 5 weight percent solid, preferably at least 25 weight percent solid, more preferably of at least 40 weight percent solid, and more preferably at least 50 weight percent solid, based on the total weight of solid additives and dispersing medium. The composition and solids level of the liquid dispersion needs to accommodate the required effective levels of the solid inorganic additive and the liquid dispersing medium as discussed above and any other solid additives optionally incorporated via the dispersion as those levels are discussed in more detail below.

Viscosity measurements for a range of dispersions of magnesium hydroxide in ESO are done using the Brookfield CAP2000+ Cone and Plate with the number 03 spindle and calibrated using Cannon N250 viscosity standard (467.6 cP @ 25° C.). A new aliquot (~24 μL) of dispersion is used for each measurement. The sample is placed on the plate and the spindle brought down onto it and allowed to equilibrate approximately one minute until the temperature was within 0.1° C. The run time was one minute for each sample and the data are shown below in Table 1.

TABLE 1

Dispersion viscosities

| % $Mg(OH)_2$ | Temp (° C.) | Speed (rpm) | Shear Rate (1/sec) | Viscosity (cP) |
|---|---|---|---|---|
| 50 | 25 | 300 | 4000 | 1928 |
| 45 | 25 | 300 | 4000 | 1467 |
| 40 | 25 | 300 | 4000 | 1202 |
| 50 | 60 | 1000 | 13333 | 323.3 |
| 45 | 60 | 1000 | 13333 | 238.5 |
| 40 | 60 | 1000 | 13333 | 195.8 |

The viscosity data show that shows that dispersions comprising from 40 to 50 weight percent magnesium hydroxide as the solid inorganic additive, at a temperature of 60° C. are sufficiently fluid and liquid to be readily and thoroughly mixed with the vinylidene chloride polymer resin powder in the process according to the invention.

Combination and mixing of the inorganic solid additive liquid dispersion with the polymer resin can be provided in a range of known techniques and employing equipment that is generally known and commercially available. The dispersion is preferably spray added, meaning that it is applied as a spray through spray nozzles or the like to resin powder that is being stirred or agitated. The liquid dispersion can also be added to the mixture in other known fashions such as being poured or dripped. Known resin blending process equipment for particulate or powder form resins includes high shear Lodige 4200 or Welex 35M blenders, preferably equipped with spray addition nozzles for spray addition of the inorganic solid additive dispersion. Optionally, the dispersion can be metered in at the extruder. In addition to reducing or eliminating agglomerates of the solid inorganic additive, this process also facilitates intimately admixing the inorganic solid additive with the polymer resin powder as a coating and reduces the segregation of the inorganic solid additive in the resin mixture. If needed, the dispersion can be filtered to remove any agglomerates prior to addition to the resin formulation. Heating of the dispersion can also be employed to help reduce the inorganic solid additive dispersion viscosity for the spray addition process, which may be needed for the higher solids levels to be used. If heated to improve dispersion of the solid additive for spray application to the solid resin, the dispersion temperature should not be high enough to melt or soften the solid vinylidene chloride polymer particles upon contact.

For the incorporation of the dispersion with solid vinylidene chloride polymer particles, generally the contacting temperature range can be from 15 to 50° C., more typically from 15 to 40° C., and preferably from 20 to 30° C. This temperature will depend, in part, upon ambient temperature of the production facility and whether any other solid additive are or will be incorporated; premature melting or agglomeration of the resin particles being desirably avoided.

In one embodiment, after spray addition of the dispersion, the remaining solid additives are dry added by shot addition or semi-continuous feeder onto the solid vinylidene chloride polymer particles while the solid vinylidene chloride polymer particles are under constant and thorough agitation. In one embodiment, the non-dispersed solid additives are premixed before they are added to the vinylidene chloride polymer particles. In various embodiments, the remaining solid additives are added at one time or in installments, and the solid additives particles in combination with the solid vinylidene chloride polymer particles are maintained in a constant stirred mix for a period of time sufficient to ensure complete or near complete and uniform or near uniform distribution of the additives in the vinylidene chloride polymer particles. The completeness of the mixing can be monitored by a number of different means including microscopic examination of the additive-coated vinylidene chloride polymer particles or a mill roll stickiness evaluation test.

Other Optional Additives

A variety of other additives as known to practitioners in this area are optionally incorporated into the composition. Additive type and amount will depend upon several factors. One such factor is the intended use of the composition. A second factor is tolerance of the composition for the additives. That is, amount of additive that can be added before physical properties of the polymer composition are adversely affected to an unacceptable level. Other factors are apparent to those skilled in the art of composition formulation and compounding. Such optional additives other than the inorganic solid additives discussed above include heat and light stabilizers, processing aids including extrusion aids and lubricants, fillers, antioxidants, process aids such as fluoroelastomers, poly(dimethyl siloxane), alkyl acrylate-alkyl methacrylate copolymers, dieneophiles, fatty acids, amides or glycerol esters thereof, pigments, dyes, other colorants, optionally with a carrier resin, silica or other antiblock agents, ignition resistance additives and combinations thereof. Each of these additives is within the skill in the art and several types of each are commercially available. Preferably, the composition contains only additives commonly used such as the listed types.

Exemplary processing aids and lubricants include acrylic process aides such as methyl methacrylate/butyl methacrylate/butyl acrylate copolymer; Styrene/acrylate copolymer; methyl methacrylate/butyl acrylate/styrene terpolymer, methyl methacrylate/butyl acrylate/butyl methacrylate terpolymer, poly(a-methyl styrene); Silicone polymer such as polydimethylsiloxane/HDPE mixture; fatty acids, such as stearic acid; esters, such as fatty esters, wax esters, glycol esters, and fatty alcohol esters; fatty acid derivatives such as fatty acid, stearic acid, metallic salt of fatty acids, magnesium stearate, calcium stearate; bisstearamide; glycerol monostearate; calcium stearoyl lactylate; stearamide; fatty alcohols, such as n-stearyl alcohol; fatty amides, such as N,N'-ethylene bisstearamide; fluorocarbons, siloxanes, ethylene vinyl acetate copolymer; and polyolefin waxes, such as paraffinic waxes, and oxidized polyethylene. Paraffin and polyethylene waxes and their properties and synthesis are described in 24 *Kirk-Othmer Encyclopedia Chem. Tech.* 3rd Ed., Waxes, at 473-77 (J. Wiley & Sons 1980).

Such other optional additives are conveniently incorporated into the compositions using any mixing process that does not have substantial adverse effects on the polymer or additives, including preferably dry blending techniques, alternatively melt blending, or other means within the skill in the art. While the amount of additives varies with the purpose and the effect of each additive, amounts of additives (excluding the solid inorganic additives and dispersing medium), such additives are typically used in amounts of less than 10, more typically less than 5 and even more typically less than 3, wt % based upon the weight of the composition with typical amounts being 0.05 to 2 wt % individually.

The general methods for the preparation of films according to the present invention, including a wide range of thickness and layer options, are generally known in the art and the equipment is generally commercially available. FILM EXTRUSION MANUAL, Process Materials, Properties, prepared by the Film Extrusion Committee of the Polymers, Laminations and Coatings Division, TAPPI, and edited by Thomas I. Butler and Earl W. Veazey, TAPPI Press, 1992, particularly in Chapter 3, discusses film extrusion processes, particularly blown film and cast film processes. The teachings of this manual indicate the skill in the art and are incorporated by reference herein to the maximum extent permitted by law.

This invention is further illustrated by the following examples. Unless stated otherwise all percentages, parts and ratios are by weight.

EXPERIMENTS

The materials employed in the Experiments are described in Table 1 below.

Experimental Film 1—A liquid dispersion of 45 weight percent $Mg(OH)_2$ in 55 weight percent epoxidized soybean oil is prepared by ball milling. The dispersion is heated to 140° F. (60° C.), filtered through a 100-micron bag filter, and spray added to the vinylidene chloride copolymer (containing 1% ESO from production) at a temperature of about 80° F. (27° C.). The resulting resin is determined to contain approximately 1% $Mg(OH)_2$ uniformly dispersed and having little or no agglomerates. A cast monolayer film is prepared from this resin using a 1.75 inch (44 millimeter) Welex extruder. Resulting film samples are visually inspected for white specks (agglomerate particles having a volume median particle size in the range from 200 to 600μ) and none were observed.

Experimental Films 2 and 3 and A-I—The multilayer experimental films below were prepared by the following film extrusion procedure. A multilayer cast coextruded film was made from layers of the indicated vinylidene chloride/methyl acrylate copolymer (PVDC) resins and layers of low density polyethylene (LDPE). The films had a total thickness of 2.0 mil and were 24 inches wide. The layer distribution was A/B/C/B/D from four extruders A through D as shown in Table 2. The PVDC layer (C) had a thickness of 0.2 mil. Layers A+B and B+D were 0.9 mil each. Extrusion conditions are shown in Table 2.

TABLE 2

VDC Polymer Film Extrusion Conditions

| | Extruder A | Extruder B | Extruder C | Extruder D |
|---|---|---|---|---|
| Extruder size | 2.5" | 2" | 1.25" | 2" |
| Resin | 501i LDPE | 501i LDPE | PVDC | 501i LDPE |
| Extruder rpm | 27 | 29 | 18 | 17 |
| Barrel zone 1 | 370° F. | 320° F. | 300° F. | 375° F. |
| Barrel zone 2 | 380 | 340 | 315 | 375 |
| Barrel zone 3 | 390 | 350 | 320 | 380 |
| Barrel zone 4 | 390 | 350 | 320 | 380 |
| Adapter/ Transfer | 390 | 350 | 320 | 380 |
| Die | | | 390 | |
| Cast roll | | | 70 | |
| Chill roll | | | 70 | |

Experimental Films 2 and 3—The following mixtures are made in a high shear Welex 35M blender. The $Mg(OH)_2$ is predispersed in the indicated amounts of "dispersion" ESO in the indicated wt %. (As noted, the PVDC resin initially contains ESO incorporated during its production.) The liquid dispersion is spray added to the agitated resin in the blender. Mixing is continued for 1 minute. The mixture is

TABLE 1

Experimental Film Raw Material Components

| Material | Brand Name | Source | Comments |
|---|---|---|---|
| Magnesium hydroxide ("$Mg(OH)_2$") | MAGSHIELD UF | Martin Marietta | 1 μm avg particle size 10 μm max particle size |
| Epoxidized soybean oil (ESO) | Plas-Chek 775 | Ferro | oxirane content 6.8-8.0 |
| Vinylidene chloride/methyl acrylate copolymer (1% ESO) | | The Dow Chemical Company | 91,000 Mw MP - 151° C. 1 wt % ESO Ex. Films 1-3 |
| Vinylidene chloride/methyl acrylate copolymer (2% ESO) | | The Dow Chemical Company | 91,000 Mw MP - 151° C. 2 wt % ESO Ex. Films A-I |
| Low density polyethylene ("LDPE") | 501i | The Dow Chemical Company | | then held for 10 minutes. Then, 0.18 lb (0.082 kg, 0.6 wt parts) lubricant/processing aid package is then added and the mixture is mixed for an additional 1 minute. The blended resin product is then coextruded as a film using the standard procedure described above in Table 2 and the number of visible white specks per five minutes was counted. The white spec counts were 1 and 3 white specks per five minutes of film production, this representing about 420 square feet (38.5 square meters) of film and providing very acceptable and suitable films.

|  | Experimental Film No. | |
|---|---|---|
|  | 2 | 3 |
| PVDC (1 wt % ESO) | | |
| lbs | 29.15 | 29.22 |
| kg | 13.22 | 13.25 |
| (parts) | (97.18) | (97.4) |
| Dispersion | 0.67 lb (2.22 wt pts) | 0.60 (2.00 wt pts) |
| Mg(OH)$_2$ | 45 | 50 |
| ESO | 55 | 50 |
| ESO in resin (from Dispersion) | | |
| lbs | 0.37 | 0.3 |
| kg | 0.17 | 0.14 |
| (parts) | (1.22) | (1.0) |
| MgOH in resin (from Dispersion) | | |
| lbs | 0.3 | 0.3 |
| kg | 0.14 | 0.14 |
| (parts) | (1.0) | (1.0) |
| White spec count (#/5 min) | 1 | 3 |

The following comparison mixtures for Experimental Films A and B are made in a high shear Welex 35M blender. The vinylidene chloride/methyl acrylate copolymer (containing 2% epoxidized soybean oil) was combined with the magnesium hydroxide and 0.3 lb (0.6 parts) of lubricant/processing aides by physical dry mixing in the blender and mixed for 1 minute. The blended resin product is then coextruded as a film using the standard procedure as shown in Table 2 above and the numbers of visible white specks per five minutes (420 ft.$^2$, 38.5 m$^2$ film) were counted. The white spec counts are 32 and 15 specks/5 minute, which are poor quality and unacceptable films.

|  | Experimental Film No. | |
|---|---|---|
|  | A | B |
| PVDC (2 wt % ESO) | | |
| lbs | 49.2 | 49.2 |
| kg | 22.3 | 22.3 |
| (parts) | (98.4) | (98.4) |
| Mg(OH)$_2$ | | |
| lbs | 0.5 | 0.5 |
| kg | 0.23 | 0.23 |
| (parts) | (1.0) | (1.0) |
| White spec count (#/5 min) | 32 | 15 |

The following further comparison Experimental Films C-I are made using different lots of Mg(OH)$_2$ and demonstrate the difficulty in avoiding the solid additive agglomerates in dry blending the solid additive. Separate blends were made in a Lodige 4200 blender. The vinylidene chloride/methyl acrylate copolymer (containing 2% epoxidized soybean oil) was combined with the magnesium hydroxide and blended for 2 minutes. Then 30.5 lb (0.6 parts) of lubricant/processing aides are added to the blender and mixed for 8 minutes. The blended resin product is then coextruded as a film using the film extrusion procedure described in Table 2 above and the numbers of visible white specks per five minutes (420 ft.$^2$, 38.5 m$^2$ film) were counted.

|  | Experimental Film Nos. C though I |
|---|---|
| PVDC (2 wt % ESO) | |
| lbs | 5000 |
| kg | 2268 |
| (parts) | (98.4) |
| Mg(OH)$_2$ | |
| lbs | 50.8 |
| kg | 23.0 |
| (parts) | 1.0 |

| Test Sample | White Speck Count |
|---|---|
| C | 24 |
| D | 22 |
| E | >100 |
| F | >100 |
| G | 55 |
| H | 49 |
| I | 72 |

What is claimed is:

1. A process for adding a inorganic solid additive to solid polymer particles, the process comprising the steps of:
    A. preparing a liquid dispersion comprising (1) the inorganic solid additive and (2) optionally one more other dispersible solid additives with (3) a liquid dispersing medium;
    B. combining the liquid dispersion with solid polymer;
    C. mixing the components (1), (3), and if present, (2);
    wherein the inorganic solid additive is present in the dispersion in a range of from 25 to 55 weight percent solid, based on total weight solid additives and dispersing medium, wherein the inorganic solid additive is magnesium hydroxide, wherein the liquid dispersing medium is epoxidized vegetable oil, and wherein the solid polymer is vinylidene chloride polymer or polyvinyl chloride.

2. The process according to claim 1 wherein the liquid dispersion comprises from 40 to 50 weight percent solid inorganic solid additive.

3. The process according to claim 1 wherein the liquid dispersion viscosity is from 50 to 500 centipoise (cP) when initially being combined with the solid polymer.

4. The process according to claim 1 wherein the epoxidized vegetable oil is epoxidized soybean oil.

5. The process according to claim 1 wherein the solid polymer is a vinylidene chloride polymer.

6. The process according to claim 5 wherein the solid polymer is a vinylidene chloride copolymer also comprising from 3.5 to 10 weight percent methyl acrylate.

7. A process for adding an inorganic solid additive to solid vinylidene chloride polymer particles according to claim 1, the process comprising the steps of:
  A. preparing a liquid dispersion comprising (1) from 40 to 50 weight percent inorganic solid acid scavenger additive and (2) optionally one more other dispersible solid additives with (3) from 60 to 50 weight percent of a liquid epoxidized vegetable oil dispersing medium which weight percent are based on (1) and (2);
  B. combining the liquid dispersion with solid vinylidene chloride polymer particles;
  C. mixing the components (1), (3), and if present, (2).

8. A process for adding an inorganic solid additive to solid polymer particles, the process comprising the steps of:
  A. preparing a liquid dispersion comprising (1) the inorganic solid additive and (2) optionally one more other dispersible solid additives with (3) a liquid dispersing medium;
  B. combining the liquid dispersion with solid polymer;
  C. mixing the components (1), (3), and if present, (2);
  wherein the inorganic solid additive is present in the dispersion in a range of from 40 to 50 weight percent solid, based on total weight solid additives and dispersing medium, wherein the inorganic solid additive is selected from: magnesium hydroxide, calcium hydroxide, calcium oxide, calcium carbonate, magnesium oxide, hydrotalcite, talc, clay, ignition resistance additives or combinations of two or more of these, wherein the liquid dispersing medium is selected from: epoxidized vegetable oil, epoxidized linseed oil, acetyl tributyl citrate, dibutyl sebecate, mineral oil, and combinations of two or more of these, and wherein the solid polymer is a vinylidene chloride copolymer also comprising from 3.5 to 10 weight percent methyl acrylate.

9. The process according to claim 8 wherein the liquid dispersion viscosity is from 50 to 500 centipoise (cP) when initially being combined with the solid polymer.

10. The process according to claim 8 wherein the inorganic solid additive is magnesium hydroxide.

11. The process according to claim 8 wherein the liquid dispersing medium is an epoxidized vegetable oil.

12. The process according to claim 11 wherein the epoxidized vegetable oil is epoxidized soybean oil.

13. A process for adding an inorganic solid additive to solid vinylidene chloride polymer particles according to claim 8, the process comprising the steps of:
  A. preparing a liquid dispersion comprising (1) from 40 to 50 weight percent inorganic solid acid scavenger additive and (2) optionally one more other dispersible solid additives with (3) from 60 to 50 weight percent of a liquid epoxidized vegetable oil dispersing medium which weight percent are based on (1) and (2);
  B. combining the liquid dispersion with the solid vinylidene chloride polymer particles;
  C. mixing the components (1), (3), and if present, (2).

* * * * *